R. E. TURNER.
WAGON BRAKE.
APPLICATION FILED JULY 12, 1909.
954,229.
Patented Apr. 5, 1910.
2 SHEETS—SHEET 1.
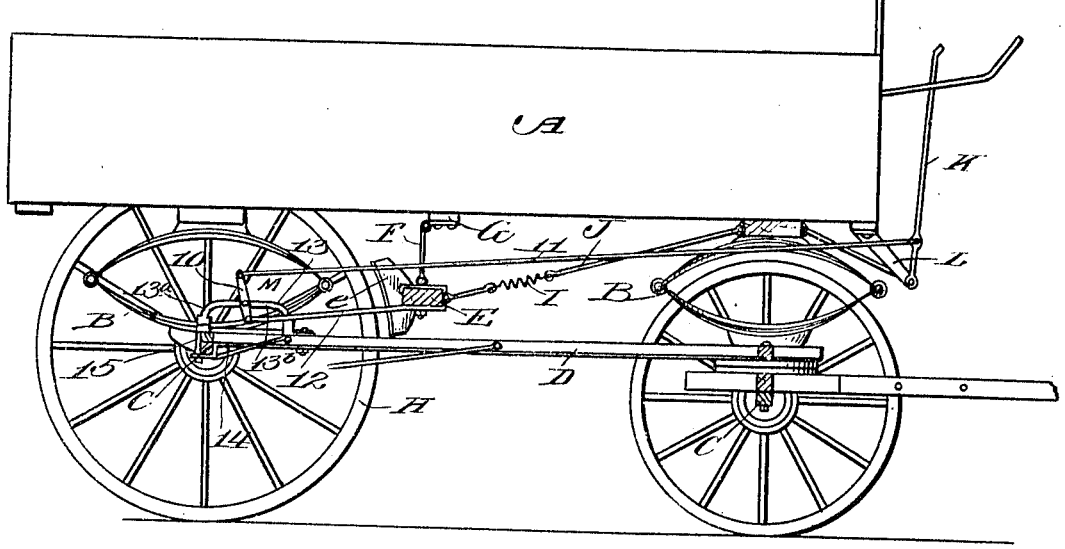
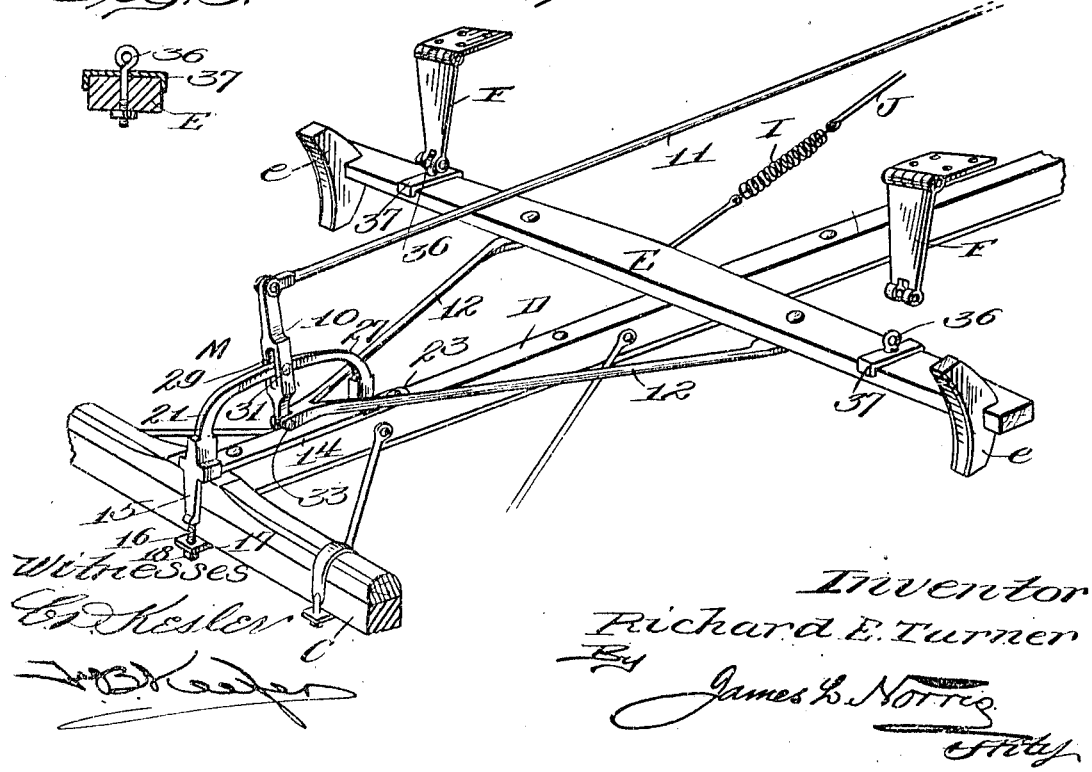
Inventor
Richard E. Turner
By James L. Norris
Atty
Witnesses R. E. TURNER.
WAGON BRAKE.
APPLICATION FILED JULY 12, 1909.
954,229.
Patented Apr. 5, 1910.
2 SHEETS—SHEET 2.
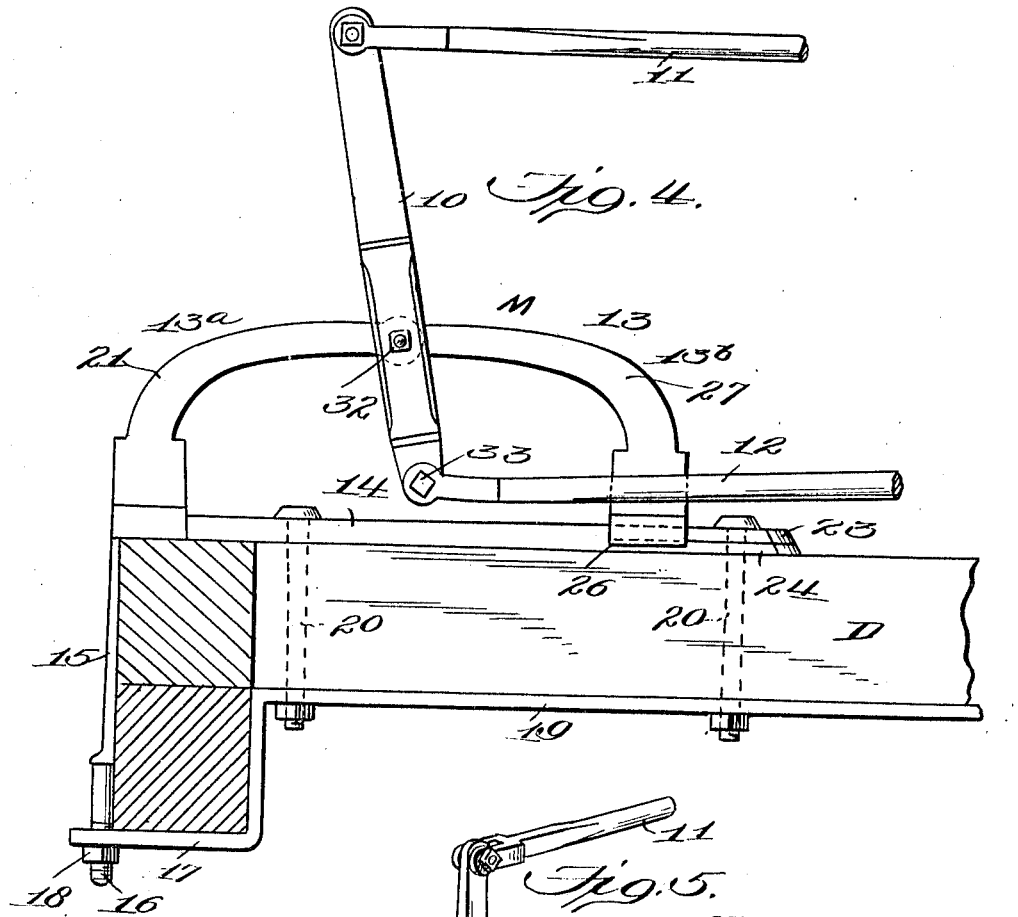
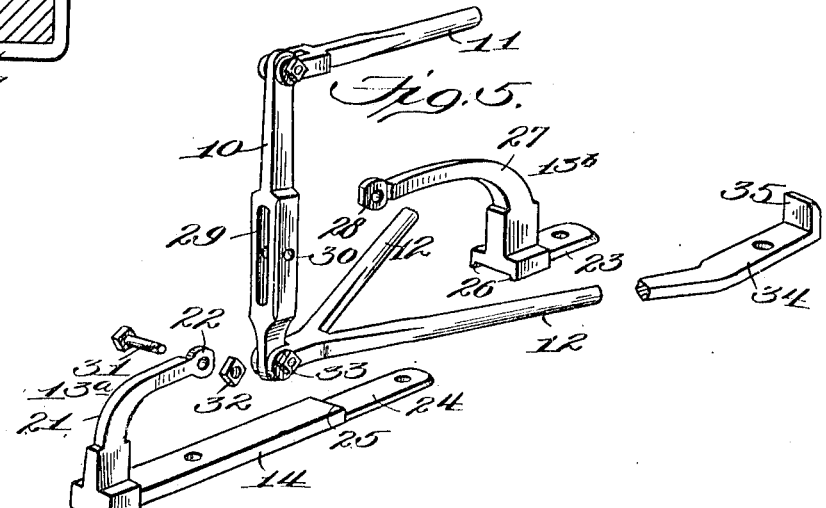
Witnesses:
Inventor
Richard E. Turner
By
James L. Norris
Atty.

UNITED STATES PATENT OFFICE.

RICHARD E. TURNER, OF ADMIRAL, MARYLAND.

WAGON-BRAKE.

954,229. Specification of Letters Patent. Patented Apr. 5, 1910.

Application filed July 12, 1909. Serial No. 507,163.

*To all whom it may concern:*

Be it known that I, RICHARD E. TURNER, a citizen of the United States, residing at Admiral, in the county of Anne Arundel and State of Maryland, have invented new and useful Improvements in Wagon-Brakes, of which the following is a specification.

This invention relates to new and useful improvements in wagon brakes and it has more particular reference to an improvement in the arrangement and the assemblage of the train of mechanical elements which transmit power from the brake lever to the brake beam.

The invention is particularly applicable for use in connection with wagons of the "spring truck" type, such an application thereof being disclosed in the accompanying drawing. This disclosure, however, is not to be regarded as placing any limitation on the application of the mechanism to wagons of other types, or as having any modifying effect on the language of the claims.

In connection with the type of wagon referred to, it is usual to transmit power to the brake beam from a rock shaft which is mounted in bearings provided on the rear axle and which carries a fast operating arm that receives a pulling stress from the brake lever. This construction is objectionable in that when the brake shoes engage the wheel a material degree of resistance is offered to the action of the mechanical train, resulting in the loss of brake applying power and the distribution of the lost balance of power to stationary parts of the mechanism. The consequence of this is a buckling of the rock shaft, frequently the displacement of the bearings thereof, and distortion and mutilation of fastening bolts, which produces undue binding of some of the parts and undue looseness of others. The efficient life of the mechanism is thus shortened, the parts becoming unfit for further practical use after a comparatively short period of time. It may be added that in order to use the apparatus for any material period such as would repay a purchaser for its cost, repairs have to be made at frequent intervals. These repairs are made by blacksmiths and the aggregate of their charges added to the initial cost of the parts, renders the brake of prohibitive expense.

The object of the present invention is to provide means for efficiently transmitting the brake applying power and involving mechanical elements of novel structure and organization and which are not affected by any distribution of lost power consequent to the resistance offered when the brake shoes engage the wheel, the ultimate purpose being to overcome the objection noted and to provide a more efficient apparatus which shall be stronger and capable of extended use without the binding of parts on the one hand or the undue looseness of parts on the other hand.

In the accompanying drawings, I have illustrated, by way of example, a preferred and advantageous embodiment of the invention.

In the said drawings: Figure 1 is a side elevation showing the application of the present improvement to a wagon of the "spring truck" type. Fig. 2 is a perspective view showing a portion of the underframe of the wagon and the brake and its related elements in their assembled disposition. Fig. 3 is a detail cross sectional view through the brake beam, showing a hanger connection thereof. Fig. 4 is an enlarged side elevation showing a transmission train constructed and assembled in accordance with the present invention. Fig. 5 is a detailed perspective view thereof showing the parts in detached relation but in the natural order of their assemblage.

Similar characters of reference designate corresponding parts throughout the several views.

Fig. 1 of the drawings discloses a wagon body A supported by springs B from the axles C, the latter being connected by the longitudinal perch D.

The brake beam is indicated by the letter E and is pivoted to hangers F, the latter being in turn hingedly connected to a cross bar G extending transversely of the body A.

The brake beam E carries at its ends, brake shoes $e$ which engage the rear wheels H and which are normally held out of engagement with said rear wheels by a spring, as I, which is interposed in a sectional rod J, having an end connected to the brake beam centrally thereof and having an end connected to the front bar of the wagon frame, as shown in Fig. 1.

At the front of the wagon a brake lever K is pivoted to a supporting bracket L and is employed to apply the brakes when desired.

The brake power transmission mechanism which forms the subject matter of the present invention, is designated in a general way by the character M and includes essentially an intermediately pivoted lever, as 10, the upper end of which is operatively connected to the lever K by a link 11 and the lower end of which is operatively connected to the brake beam E by a V-shaped link or yoke, as 12. The lever 10 is pivoted to an arched frame, as 13, which is conveniently made in two sections, 13$^a$ and 13$^b$. The section 13$^a$ includes a base, as 14, which is bolted to the rear end of the perch D and which has at its rear end a depending leg, as 15, which terminates in a threaded extension 16. The leg 15 overlies the rear face of the perch and its extension 16 is passed through an aperture in the angle plate 17 and secured by a nut 18. The angle plate 17 fits under the rear axle and may be formed as a part of or otherwise connected to the longitudinal strap 19 which extends under the perch D as a reinforcement therefor and through which the bolts 20 that secure the base 14, extend. The section 13$^a$ also includes an arch segment, as 21, which extends in longitudinal, overhanging relation to the base 14 and terminates in an eye 22. The section 13$^b$ is formed with a base 23 which fits over an attenuated extension 24 of the base 14, abuts a shoulder, as 25, afforded by said extension, and is provided with side flanges, as 26, which overlie the sides of the extension and hold the section 13$^b$ against lateral play. The forward bolt 20 which secures the base 14 to the perch, also serves to secure the base 23 to the base 14. The section 13$^b$ also includes an arch segment, as 27, which terminates in an eye 28 and projects longitudinally of the base 14 in a rearward direction. The lever 10 is formed with a central longitudinal slot, as 29, which receives the mutually adjacent end portions of the arch segments 21 and 27 and which is formed with alining openings 30. A bolt, as 31, passes through the openings 30 and also through the eyes 22 and 28 which are disposed in registering relation, and carries on its threaded end a securing nut 32. The bolt 31 constitutes the intermediate pivot of the lever 10 and also constitutes a pivotal connection between the segments 21 and 27, under circumstances to be described. The V-shaped link or yoke 12 has at its rear end a bifurcated apex portion which is pivoted to the lower end of the lever 10 by a connection 33, as shown in Fig. 5.

In assembling the parts, the ends of the segments 21 and 27 are passed into the slot 29 and secured by the bolt 31. The segment 27 is then lifted upwardly, the bolt 31 serving as a pivot center, and the yoke or link 12 is passed under the segment 27 and its apex end secured to the lower end of the lever 10 in the manner explained. The segment 27 is then moved downwardly until its base 23 rests upon the extension 24, at which time the parts are secured by the bolts 20.

The divergent arms of the yoke or link 12 terminate in flattened portions, as 34, which are secured to the under face of the brake beam D by suitable fastenings and which are provided at their forward ends with upstanding lugs, as 35, that overlie the front face of the brake beam E and take the pulling stress of the link 12 from the devices which connect the portions 34 to the brake beam.

The hangers F are pivoted to eye bolts, as 36, which are secured in the brake beam, as shown in detail in Fig. 3, and which also serve as fastenings for wear plates, as 37, against which the knuckles of the hangers F bear.

In use, a forward movement of the lever K produces a rearward movement of the lower end of the lever 10 which results in the corresponding movement of the brake beam and the engagement of the shoes e against the peripheries of the wheels H. The resistance offered as an incident of this engagement does not, however, affect the assemblage of the elements of the power transmission train, since the arch 13 is held rigidly on the perch not only by the bolts 20 but also by the depending part 15 which, bearing against the rear face of the perch, resists any forward pulling stress. Owing to the fact that the point at which the pull is transmitted to the brake beam, namely, the pivot 33, is in the common plane of movement of the lever 10 which includes the stationary point 31 whereat any surplusage of power is expended, there is not that liability of the parts to become distorted and broken which would be present were the two points referred to in different planes, as is the case in the construction identified in the introductory paragraphs of the specification. The assemblage of elements is furthermore of such nature that the mechanical train may be readily and quickly set up and dismantled.

The invention, while effectually attaining the advantages previously referred to, does not sacrifice the requisite incidents of simplicity and inexpensiveness.

Having fully described my invention, I claim:

1. The combination with a brake lever, a brake beam and a longitudinal support, of a longitudinal arch frame comprising two arch segments, means to connect each segment to the support, a two-armed lever, a bolt connecting the segments to one another and also serving as the pivot of the two-armed lever, a link connecting the upper end of the two-armed lever and the brake lever and a link connecting the lower end of the two-armed lever and the brake beam.

2. The combination with a brake lever, a brake beam, and a longitudinal perch, of a longitudinal vertically disposed arch frame imposed upon the perch and having a base fixed thereto, a lever pivoted between its
5 ends to the arch frame and arranged directly above the perch, a link connecting the upper end of the pivoted lever and the brake lever, and a V-shaped link connecting the lower end of the pivoted lever and the brake beam,
10 and having its apex portion joined to the lever, the beam and its connecting link being disposed above the perch.

In testimony whereof I have hereunto set my hand in presence of two subscribing witnesses.

RICHARD $\underset{\text{mark}}{\overset{\text{his}}{\times}}$ E. TURNER.

Witnesses:
 SAMUEL C. ANDERSON,
 JAMES L. CHARNY.